(12) United States Patent
Johnson

(10) Patent No.: US 6,191,348 B1
(45) Date of Patent: Feb. 20, 2001

(54) INSTRUCTIONAL SYSTEMS AND METHODS FOR MUSICAL INSTRUMENTS

(76) Inventor: Steven T. Johnson, 1218 Third Ave., #1900, Seattle, WA (US) 98101

(*) Notice: Under 35 U.S.C. 154(b), the term of this patent shall be extended for 0 days.

(21) Appl. No.: 09/396,004

(22) Filed: Sep. 13, 1999

(51) Int. Cl.[7] .................................................. G10G 7/00
(52) U.S. Cl. ..................... 84/485 R; 84/477 R; 84/670 R
(58) Field of Search ............................ 84/485 R, 477 R, 84/470 R

(56) References Cited

U.S. PATENT DOCUMENTS

| | | |
|---|---|---|
| 3,403,591 | 10/1968 | Weitzner . |
| 3,837,256 | 9/1974 | Gullickson . |
| 3,854,370 | 12/1974 | Sapinski . |
| 4,080,867 | 3/1978 | Ratananqsu . |
| 4,286,495 | 9/1981 | Roof . |
| 4,791,848 | 12/1988 | Blum, Jr. . |
| 4,807,509 | 2/1989 | Graham . |
| 5,266,735 | 11/1993 | Shaffer et al. . |
| 5,307,217 | * 4/1994 | Saliba ...................................... 360/76 |
| 5,373,768 | 12/1994 | Sciortino . |
| 5,392,682 | 2/1995 | McCartney-Hoy . |
| 5,408,914 | 4/1995 | Breitweiser, Jr. . |
| 5,442,986 | 8/1995 | Cota . |
| 5,594,191 | * 1/1997 | Epstein et al. ..................... 84/485 R |

* cited by examiner

Primary Examiner—Robert E. Nappi
Assistant Examiner—Shih-yung Hsieh
(74) Attorney, Agent, or Firm—Michael R. Schacht; Hughes & Schacht, P.S.

(57) ABSTRACT

Instructional systems and methods for musical instruments. An array of graphic note elements are arranged on a neck of a musical instrument such that they are visible from behind or on top. The graphic note elements are controlled to indicate where a player should place his or her fingers. The player need not hold the instrument in an unnatural position while simultaneously playing the musical instrument and viewing the graphic note elements. The graphic note elements may be integrally formed on or imbedded in the back of the instrument's neck so as not to interfere with the player's hand. A control circuit is used to control the operation of the graphic elements. The control circuit may also be connected to a CD player on which control, background, and instructional data is encoded. In this case, the control circuit will control the graphic note elements using the control data, play the background data as background music to accompany the player, and/or play the instructional data in a manner that allows the player to see, hear, or feel playing instructions.

23 Claims, 3 Drawing Sheets

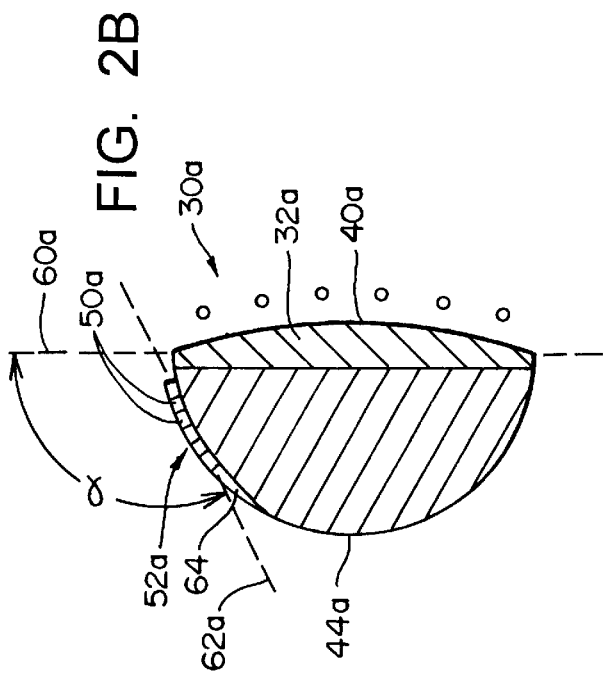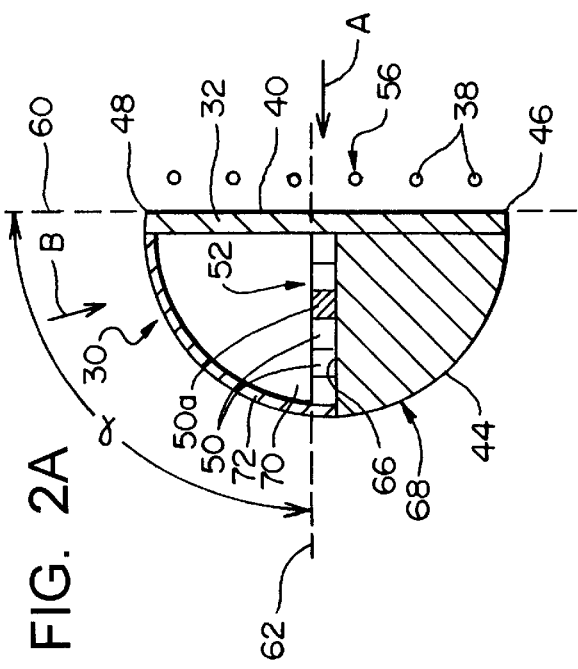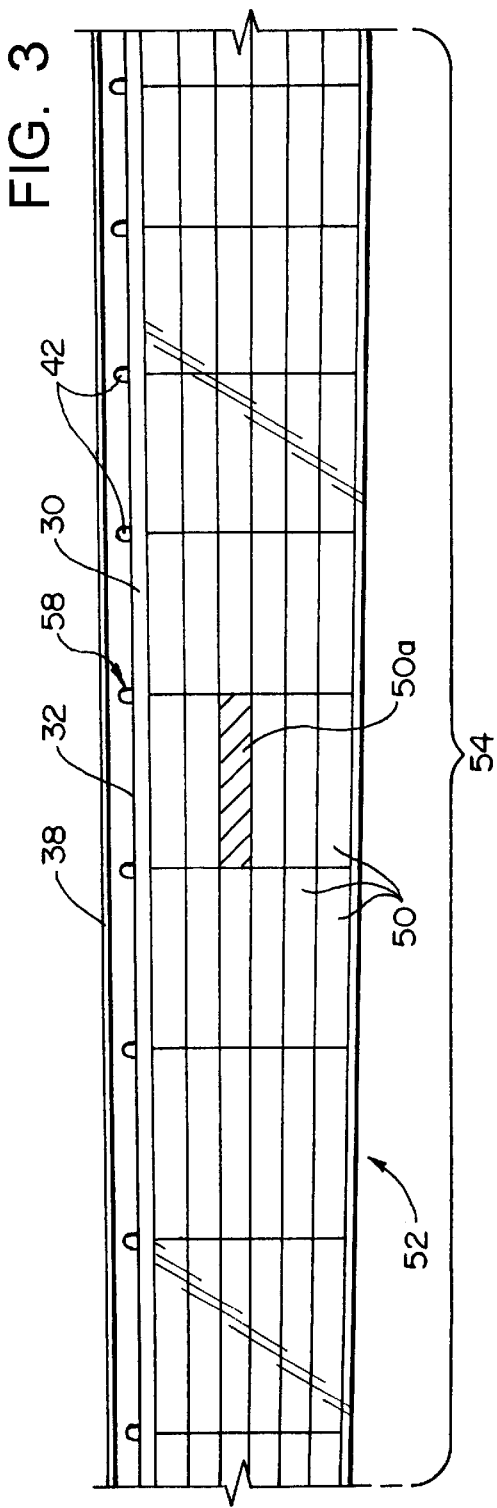

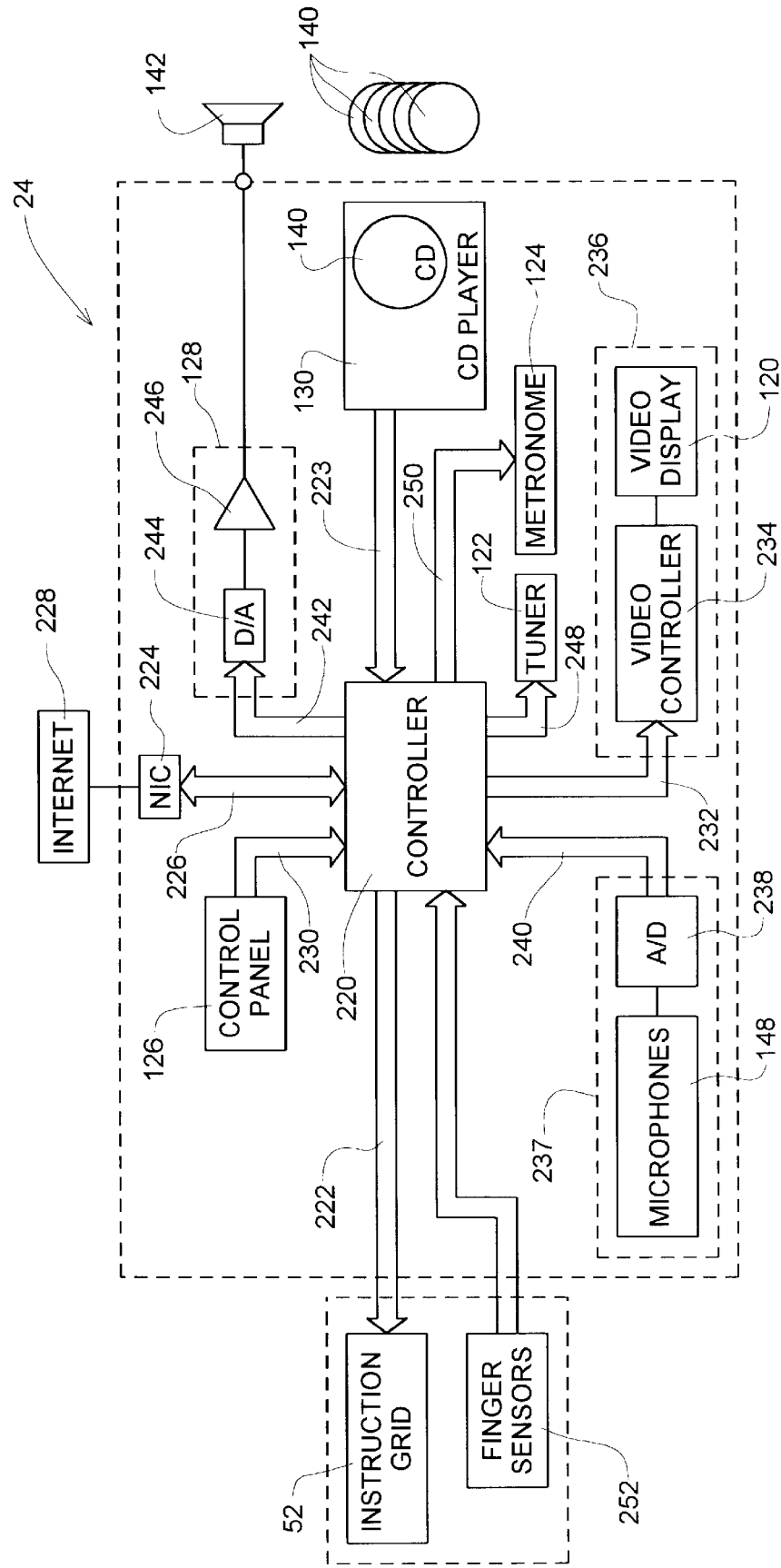

INSTRUCTIONAL SYSTEMS AND METHODS FOR MUSICAL INSTRUMENTS

FIELD OF THE INVENTION

The present invention relates to musical instruction and, more particularly, to musical instruments such as guitars or the like having integral means for displaying to the player the appropriate finger placement for a desired sequence of notes and/or chords.

BACKGROUND OF THE INVENTION

Mastery of a musical instrument has long been considered a significant accomplishment. In addition to the enjoyment of playing music for oneself and others, music education has been recognized to improve skills in other disciplines such as mathematics.

Traditionally, students of a musical instrument have been taught by an experienced musician, usually one on one but in some situations in small groups. The private lesson approach can be very effective but requires a significant monetary investment. Many potential students cannot afford the costs of private music lessons. Even the costs of providing music education in small groups can be prohibitive, and many school districts have stopped offering music classes because of the expense involved.

In addition to the monetary costs, music education, especially the private lesson approach, can require a significant time investment. Children as well as adults have full schedules, and the time required to transport the student to a scheduled music class can be as much a barrier to musical education as the financial costs.

And even if it is possible to meet with regularity for private lessons and pay for these lessons, every hour of lesson is usually accompanied by several hours of practice time outside of the presence of the instructor. During this practice time, it would be desirable for the instrument to automate the training process.

For these and other reasons, many potential music students are not able to obtain their goal of mastering a musical instrument.

A number of attempts have been made to automate the process of musical education. For example, computers have long been integrated with musical keyboards for the purpose of keyboard (piano, organ, harpsichord, synthesizer, etc.) training.

Keyboard training is particularly suited for automation such as by integration with a computer. Traditionally, the musical keyboard is arranged generally horizontally in front of the player, and paper sheet music is placed above the keyboard so that both the keyboard and the sheet music are within the player's line of sight. To automate the training process, the computer screen is simply substituted for the paper sheet music so that both the musical notation, video clips, written instruction, and the like on the computer screen and the keyboard are within the player's line of sight. A student can thus view finger placement while following instructions on the screen.

The automation of musical training also includes arranging small lights on the instrument to indicate the fingering required to play a sequence of chords and/or notes. For example, lights may be placed on the keys of a keyboard. The lights are operated in a sequence dictated by a desired musical piece. The player presses the keys as they are lighted to play the desired musical piece. The use of lights on the instrument works very well in the context of a musical keyboard that is arranged horizontally in front of the player.

The automation of training on non-keyboard instruments is not so straight forward. The present invention relates primarily to musical instruments, such as guitars, bass guitars, upright basses, banjoes, cellos, and the like, that have vibrating strings suspended above a fingerboard. With this type of instrument, the player presses the strings against the fingerboard to shorten the effective length of the string and thus change the note created when the string vibrates. Often, frets are arranged at predetermined locations along the fingerboard to space the string slightly above the fingerboard when fingered. The locations of the frets normally correspond to notes on the musical scale, and the frets space the strings from the fingerboard to reduce any interference by the fingerboard with the vibration of the string.

Many musical instruments employing suspended strings and a fingerboard are played with the fingerboard not directly viewable by the player. For example, a guitar player will arrange the body of the guitar above one thigh with the neck of the guitar extending above the other thigh. When played with proper form, the strings and fingerboard of a guitar are facing away from the player in a generally vertical plane spaced below and to one side of the viewer's eyes. The strings and fingerboard of a guitar are thus usually not wholly viewable by the player.

With this type of instrument, conventional automated training devices as described above do not work well. For example, when a guitar is played with proper form, the strings and fingerboard and the sheet music or computer screen arranged in front of the player are normally not both within the player's line of sight. And since the fingerboard can be completely viewed by the player only with the guitar arranged in an improper playing position, arranging lights on the fingerboard to indicate proper fingering is not conducive to learning proper technique.

The need thus exists for improved systems and methods for learning musical instruments employing strings suspended above fingerboards and in which the fingerboard is not normally within the player's line of site.

RELATED ART

The following references were uncovered as the result of a professional patentability search performed on behalf of the Applicant.

U.S. Pat. Nos. 3,854,370, 4,286,495, 4,791,848, 4,807,509, 5,266,735, and 5,408,914 all disclose guitar assemblies having lights embedded in the fret board at the juncture of the frets and the strings to indicate which note should be played. With all of these devices, the guitar player must lean out over the guitar (or rotate the guitar back) and to view the fret board to determine which lights are lit. These devices require the player to play the guitar in an improper position.

U.S. Pat. No. 3,403,591 discloses a device that is attached to the neck of guitar. Lights on the device indicate which notes are to be played. This device is very similar to those described in the previous paragraph, but is intended as an add-on to a conventional guitar and is not formed as an integral part of the guitar. As with the integral devices described above, the lights are arranged in an array that is arranged parallel to the fret board and thus require the player to play the guitar in an improper position.

U.S. Pat. No. 4,080,867 uses an X-Y coordinate system to indicate which note is to be played. A first set of six lights indicating which string is to be played is arranged at the end of the guitar neck near the tuning pegs. And at the upper edge of the neck of the guitar at each fret is located a light indicating the location along the neck at which the player's finger is to be placed. The player must view both sets of lights to determine where to place his or her fingers.

U.S. Pat. No. 5,442,986 discloses a collapsible guitar-like instrument. This device does not appear to be an instructional device and is of interest primarily because it contains an integral CD-ROM player. This CD-ROM player does not appear to included for any purpose other than playback of conventional CD-ROM disks.

The following patents relate more generally to instructional devices for musical instruments but do not specifically relate to guitars.

U.S. Pat. No. 3,837,256 is a keyboard in which lights are embedded in the keys. These lights are controlled to indicate the player which keys are to be pressed. U.S. Pat. No. 5,392,682 discloses a computerized training device to teach users how to play piano.

OBJECTS OF THE INVENTION

As should be apparent from the foregoing, one object of the present invention is to provide improved systems and methods for teaching students how to play musical instruments.

Another more specific object of the present invention is to provide such teaching systems and methods having a favorable mix of the following characteristics:

- allows the player to learn fingering techniques without the need for an on-site individual instructor;
- allows the player to play the instrument in a natural position;
- allows a high degree of interaction between an instructor and a student at different locations;
- allows significant control over all facets of the instruction process;
- can be incorporated into an instrument in a manner that allows the instrument to played normally when not used as an instructional instrument; and
- can be easily and inexpensively manufactured using currently available technologies.

SUMMARY OF THE INVENTION

These and other objects may be obtained by an instruction system incorporating a musical instrument having a fingerboard and string members that are not directly within the player's line of sight, a plurality of display segments arranged in an instruction grid, and a controller for controlling the display segments to display note instructions to the player. The instruction grid is arranged at an angle to the fingerboard such that the instruction grid faces the player even though the fingerboard generally faces away from the viewer. The player can thus view the note instructions while holding the instrument in a normal playing position.

The instruction grid is preferably embedded within a back portion of a neck assembly that defines the fingerboard or attached to a back surface of the fingerboard. The instruction grid is also preferably substantially planar and defines a viewing plane that extends at a viewing angle with respect to the fingerboard. The viewing angle is approximately 90 degrees.

The instrument constructed in accordance with the present invention can be used in a system further comprising video display means, audio playback means, a data retrieval system such as a CD player or the like, and/or means for connecting the instrument to a network such as the Internet. The teaching process can be entirely automated or can be conducted under control of a teacher. The teacher need not be located in the physical presence of the student; to the contrary, the teacher may be located anywhere and communicate with the student through the Internet.

BRIEF DESCRIPTION OF THE DRAWING

FIGS. 2A and 2B are sectional views taken along lines 2—2 in FIG. 1;

FIG. 3 is a top plan view of a portion of the guitar depicted in FIG. 2A showing an instructional grid forming a part thereof;

FIG. 4 is a simplified block diagram depicting an exemplary electrical portion that may be used with the instructional guitar of FIG. 1.

DETAILED DESCRIPTION OF THE INVENTION

Figure 1:
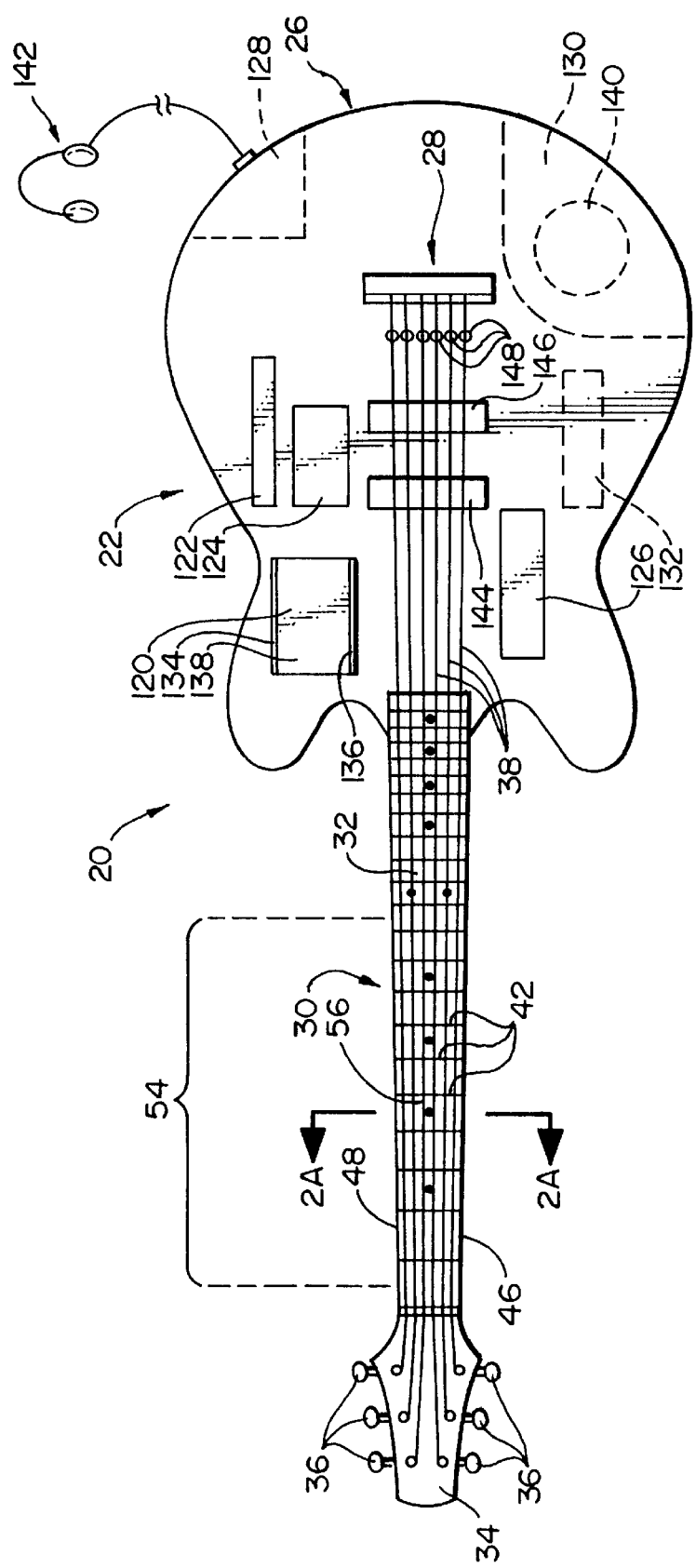
FIG. 1 is a plan, elevational view depicting an instructional guitar of the present invention and schematically depicting certain components thereof.

Referring to the drawing, depicted in FIG. 1 thereof is an instructional system 20 constructed in accordance with, and embodying, the principles of the present invention. This system 20 comprises an instrument 22 and, as shown in FIG. 4, an electrical subsystem 24.

The instrument 22 is in many respects conventional or traditional. In the following discussion, the basic instrument will initially be described in its conventional or traditional form. Following that, the structural modifications to the basic instrument required by the exemplary instructional system 20 will be described. After that will be presented a discussion of the electrical subsystem 24. And finally, certain variations on and options presented by the instructional system 20 will be described.

I. The Basic Instrument

The instrument 22 is, in the preferred embodiment, a guitar, but may be any one of a number of stringed instruments. The guitar 22 comprises a body assembly 26 and a neck assembly 30. The body assembly 26 is or may be conventional, and a bridge assembly 28 is mounted on the body assembly 26. The neck assembly 30 is rigidly attached to the body assembly 26 such that the neck assembly 30 extends from the body assembly 26. The neck assembly 30 is conventional in that it comprises a finger board 32, a head portion 34, and tuning pegs 36 secured to the head portion 34.

A plurality of string members 38 are attached at one end to the bridge assembly 28 and at the other end to the tuning pegs 36. As perhaps best shown in FIG. 2, the strings 38 are suspended immediately adjacent to a playing surface 40 on the neck assembly 30; the neck assembly 30 is defined by the fingerboard 32. A plurality of frets 42 are arranged perpendicular to the string members 38 at predetermined locations on the fingerboard 32. In addition to the playing surface 40, the neck assembly 30 comprises a bracing or palm surface 44.

Referring to FIGS. 1 and 2, it can be seen that the neck assembly comprises first and second elongate neck edges 46 and 48 that extend from the body assembly 26 to the head portion 34. The string members 38 are substantially parallel to the neck edges 46 and 48 during normal use. The playing surface 40 extends between the neck edges 46 and 48 along a front portion of the neck assembly 30, while the bracing surface 44 extends between the neck edges 46 and 48 along a back portion of the neck assembly 30.

As described above, the guitar 22 is generally conventional and can be played in a conventional manner. In particular, the string members 38 can be caused to vibrate by plucking, picking, or strumming them. The effective length of the string determines the frequency at which the string member 38 vibrates. Changing this effective length changes the note sounded by the string.

Accordingly, the notes created by the strings 38 can be changed by depressing the string members 38 in the direction shown by arrow A in FIG. 2. By bringing the strings in contact with the playing surface 40, or in the exemplary instrument 22 with the frets 42 on the playing surface 40, the effective length of the string is changed. The player's palm and thumb engage the bracing surface to allow sufficient force to be applied to the string members 38. To tune the guitar 22, the tuning pegs 36 and/or the bridge assembly 28 may be operated to alter the tension on the string.

Of the foregoing components, all except the neck assembly 30 are or may be conventional; any commercially available bridge assembly, head portion, tuning peg, string member, and/or fret member may be used in the exemplary guitar 22. These components will thus be described herein only to the extent necessary for a complete understanding of the present invention.

It should be noted that, while the instrument 22 is depicted as a guitar, a number of other instruments share certain characteristics with guitars that render these instruments appropriate for use with the present invention. For example, instruments such as cellos, acoustic basses, electric bass guitars, banjoes, and the like all employ neck assemblies having fingerboards that are out of the player's line of sight during normal playing. The neck assemblies of these instruments all further define a bracing or palm surface that faces towards the player.

II. Structural Modifications to the Basic Instrument

Structurally, the guitar 22 differs from conventional guitars primarily in the composition and construction of the neck assembly 30. In particular, as shown in FIGS. 2 and 3, the neck assembly 30 comprises a plurality of display segments 50 embedded in the neck assembly 30. As will be described in further detail below, the term "display segment" means any controllable means for visually communicating at least binary ("on" or "off") information to a player. Certain types of display segments can communicate information, such as characters or symbols, in addition to simple binary information.

As can perhaps best be shown in FIG. 3, the display segments 50 are arranged in an instruction grid 52. The instruction grid 52 arranges the display segments 50 at locations corresponding to possible locations on the finger board at which the string members 38 may be depressed to form notes.

In particular, referring to FIGS. 2 and 3, it can be seen that a display segment 50a is shaded. Placing FIG. 3 in the context of FIG. 1 as shown by bracket 54, it can be seen that the shaded display segment 50a corresponds to a horizontal location equivalent to the third string from the bottom, as shown by reference character 56 in FIG. 2, and, as shown by reference character 58 in FIG. 3, the fifth fret from the head portion 34. The instruction grid 52 thus instructs the player to place his or her finger at the location indicated by reference character 56 in FIG. 1.

The display segments 50 in the instructional grid 52 thus each correspond to a single location on the playing surface 40 of the finger board 32. Each of these locations corresponds to a note that may be formed by playing the instrument 22.

Additionally, the display segments 50 are physically arranged along the neck assembly 30 at locations corresponding to the locations on the playing surface 40 at which notes are formed. Thus, as perhaps best shown in FIG. 3, the shaded display segment 50a is spaced along the neck assembly 30 at the location 56 where the string is to be depressed. The exemplary instruction grid 52 thus arranges display segments 50 in a scale representation of the locations at which notes are formed on the fingerboard 32. While in the preferred mode of the present invention the instruction grid 52 is to scale, the instruction grid may represent the fingerboard in a smaller scale such as ½ scale or ⅓ scale.

As briefly discussed above, the display segments 50 can be formed of any one of a plurality of physical structures that may be controlled to indicate to the player which intersection of string members 38 and fret members 42 is desired.

For example, the segments 50 may simply be formed by LEDs that are electrically energized as appropriate. The graphic segments 50 may be implemented by forming the entire instructional grid 52 of a single liquid crystal display panel or a plurality of such panels arranged edge-to-edge. These panels would be controlled in a conventional manner to form characters or symbols at the appropriate locations. Yet another manner of forming these display segments 50 would be to use optical fibers having ends arranged to emit light when light is introduced at the other end thereof. The use of display segments of any one of these types, or other types not specifically addressed herein, would be clear to one of ordinary skill in the art given the explanation herein.

The primary purpose of the display segments 50 is to display fingering information to the player. In particular, during normal playing of the guitar 22, the player's line of sight will be along a line generally indicated by arrow B in FIG. 2 such that the player generally looks down towards the rear portion of the neck assembly 30 and onto the display segments 50. Accordingly, while the player does not have a clear view of the fingerboard 32, the player does have a clear view of the display segments 50 arranged in the instruction grid 52.

By appropriately controlling the display segments 50, the player can observe information that instructs the player in real time how to play sequences and/or combinations of notes corresponding to exercises, tunes, chord progressions, and the like. The player need simply place his or her fingers as indicated by the display segments 50.

The physical arrangement of the instruction grid 52 relative to the fingerboard 32 is of significance. The term "plane" is used in the present application to describe this physical arrangement. More specifically, the term "plane" is used herein in relation to surfaces and configurations that are not strictly "planar" in the mathematical sense of the word. For example, with certain types of guitars, the playing surfaces defined by the fingerboard may be slightly convex instead of flat as with the playing surface 40 shown in the exemplary guitar 22.

In this context, the terms "fingerboard plane" and "playing plane" refer herein to a plane coextensive with the playing surface 40 or to a plane symmetrically extending through the playing surface if the playing surface is not strictly planar. The term "viewing plane" similarly refers to a plane coextensive with or symmetrically extending through the instruction grid 52.

Referring to FIG. 2A, depicted therein is a fingerboard plane 60 and a viewing plane 62. With the exemplary neck assembly 32, the viewing plane 62 extends at a viewing angle α relative to the fingerboard plane 60. The viewing angle α is approximately 90° for the neck assembly 30. As generally described above, this arrangement places the instruction grid 30 in clear view of the player during normal playing.

FIG. 2A also shows that the exemplary instruction grid 52 is formed on a grid surface 66 of a neck member 68. The neck member 68 must be sufficiently rigid to bears the loads created by the string members 38 under tension. The grid surface 66 defines the viewing angle and thus is substantially perpendicular to the fingerboard 32.

The neck member 68 defines a neck cavity 70 above the instruction grid 52. The neck cavity 70 may be a simple void, in which case a separate viewing member 72 is provided. The viewing member 72 extends along the length of the neck assembly 30 and is arcuate in cross-section. The viewing member 72 thus defines a portion of the bracing surface 44 but is made of a clear material such that the instruction grid 52 is visible to the player. The viewing member 72 may be fixed in the position shown in FIG. 2A or removable to allow access to the neck cavity 70 and the display segments 50 therein.

An alternative to using a separate viewing member such as the member 72 is to fill in the entire neck cavity 70 with a clear material that forms a part of the bracing surface 44 and allows the player to view the instruction grid 52.

Referring now to FIG. 2B, depicted therein is another exemplary neck assembly 30a. This neck assembly 30a includes a bracing surface 44a, a plurality of display segments 50a arranged in an instruction grid 52a, and a fingerboard 32a having a curved playing surface 40a.

The instruction grid 52a is attached to the neck assembly 30a such that the display segments 50a form a portion of the bracing surface 44a. The display segments 50a may be inlaid into the neck assembly 30a or attached thereto with a transition member 64 forming a continuous bracing surface 44a. The instruction grid 52a is thus attached to the neck assembly 30a in a manner that allows the neck assembly 30a to be conventionally formed, such as of solid wood, and without providing distracting discontinuities on the bracing surface 44a.

The exemplary fingerboard 40a is not planar but defines a fingerboard plane 60a. The instruction grid 52a is also non-planar but defines a viewing plane 62a. In the exemplary neck assembly 30a, the fingerboard plane 60a extends from the viewing plane 62a at a viewing angle α that is approximately 100. As with the neck assembly 30 described above, the viewing plane 62a is arranged such that the instruction grid 30 is in clear view of the player during normal playing.

The viewing angle α at which the viewing plane extends relative to the fingerboard plane is an important component of the present invention because this angle allows the instruction grid to be in clear view of the player when the guitar is played in a normal, comfortable position. In contrast, with prior art instructional systems for this type of instrument, the equivalent of this viewing plane is arranged substantially parallel to the fingerboard plane and usually within the fingerboard itself. The instructional information is thus not in clear view of the player when the instrument is played normally.

For a guitar, this viewing angle α is preferably within a first preferred range of substantially between 85° and 105° but in any event should within a second preferred range of substantially between 45° and 135°.

The instruction grid is capable of communicating one or more of a number of types of data to the player.

In a simple form of the invention, the display segments communicate note instructions that instruct the player where to place his or her fingers. Such note instructions can be communicated by binary display segments that are simply turned on or left off as appropriate to indicate finger placement.

Another form of the invention would display, in addition to note instructions, fingering instructions that indicate variations on simply playing a single, discrete note. These fingering instructions include indicating whether the certain strings are to be plucked or strummed and whether the string is stretched to change the note being generated. The display of fingering instructions would likely require more than a simple binary display segment, and an LCD display capable of displaying letters and symbols may be required to communicate these more complex fingering instructions.

An extra row of display segments can be provided to indicate strumming instructions. These extra segments are associated one with each string and are lit or not lit depending upon whether a particular string is to be played. Arrows and other symbols may be used to indicate strumming directions or which finger is used to pluck a string when an individual string is to be plucked. Clearly, these strumming instructions will be generated for a given set of note instructions. If followed, the combination of the note instructions and the strumming instructions allow the player to play an entire guitar piece.

III. Electronic Subsystem

Referring again to FIG. 1, depicted therein are a number of electronic devices that form part of the exemplary instructional system 20. In particular, a video display panel 120, a tuning display 122, a metronome 124, a control panel 126, a digital integrated amplifier 128, a CD player 130, and a control circuit 132 may be attached to or built into the body assembly 26. These components 120–132 are or may be conventional and will not be discussed herein beyond what is necessary for a complete understanding of the present invention.

The display panel 120 should be located as close to the player's line of sight as possible during normal playing and thus is located on the body assembly 26 adjacent to the neck assembly 30 and spaced above the string members 38. The display panel 120 is attached to the body assembly either by a top hinge identified by reference character 134 or by a bottom hinge indicated by reference character 136. The hinge 134 or 136 allows the display panel 120 to be rotated between a storage position and a viewing position. In the storage position, the display panel 120 does not interfere with normal playing or storage of the instrument 22. In the viewing position, a display surface 138 of the display panel is at an angle relative to the playing plane 60 and thus easily viewable by the player. Appropriate display panels are the type commonly used on portable television sets and video cameras. Typically these panels are approximately three by five inches in size.

The control panel 126 allows the player to input commands and respond to prompts and thus must be easily accessible to player's hand. The exemplary control panel 126 is thus located on the body assembly 26 adjacent to the neck assembly 30 below the string members 38 within easy reach of the player's strumming hand. The control panel 126 can be formed by discrete buttons, a keypad, a touch screen, or combination thereof that allows the player to generate input data for use by the instruction system 20.

The exact placement of the remaining components is not critical as long as they are able to perform their intended function.

For example, the CD player 130 is designed to play one of a plurality of CDs 140. The CDs 140 must be inserted into and withdrawn from the player 130, so placing the CD player 130 with its CD cartridge opening onto a bottom edge at the back of the instrument 22 would allow appropriate access thereto.

The integrated amplifier 128 will normally be connected to a speaker system such as headphones 142 shown in FIG. 1. The headphones 142 are conventional and allow the player to sense audio signals as will be discussed in detail below.

FIG. 1 further shows that the pickups 144 and 146 and/or microphones 148 may be mounted on the body assembly 26. The pickups 144 and 146 are of the type that are conventionally provided on electric guitars and allow the guitar 22 to be used as a conventional electric guitar. The microphones 148 are used to generate audio signals that may be used in the instructional system 20 as will be described in further detail below.

Referring now to FIG. 4, depicted therein is a block diagram depicting in more detail the construction and composition of the exemplary electrical portion 24 of the instructional system 20.

The electrical portion 24 can be embodied in a simple configuration capable of displaying only note and fingering information as described above or in any one of a number of more complex configurations depending upon the feature set desired or required by the player.

In any configuration of the system 20, a controller 220 is provided to control the display segments 50. As shown in FIG. 4, the controller 220 is connected via a data path 222 to the instruction grid 52. The controller 220 is also operatively connected to the CD player 130 by a data path 223. As will be discussed in more detail below, the controller 220 controls the display segments 50 based on data obtain from a selected one of the CDs 140 that is loaded into the CD player 130.

It should be noted that the CD player 130 and CDs 140 are currently the preferred method of obtaining data for operating the display segments 50. One of ordinary skill in the art would recognized that other data retrieval means or methods, such as cassette tapes, 3.5" floppy discs, or DVD discs, and players therefor, or other proposed memory storage devices not currently on the market, may be used instead of or in conjunction with the CD player 130.

Another example of a source of data is a network interface card (NIC) 224 that is connected to the controller 220 by a data path 226. The NIC 224 allows the controller 220 to be connected to a remote data source such as a remote computer on a local network or a data source or storage device connected to the Internet as shown at 228 in FIG. 4. The possibilities that are presented when using the instruction system 20 when connected to the Internet will be discussed in more detail below.

The controller 220 is connected by a data path 230 to the control panel 126. The player can thus input instructions and data directly to the controller 220.

The controller 220 is further connected by a data path 232 to a video controller 234. The video controller 234 forms a video display is system 236 with the video display 120. The controller 220 may thus display video signals, graphics, and other visual means of conveying information on the video display 120.

The microphones 148 form an audio system 237 with an analog to digital converter 238. The audio system 237 generates digital audio data that is transmitted over a data path 240 to the controller 220. The digital audio data represents the audio signals detected by the microphones 148. In the exemplary system 20, one microphone is used for each string member 38. The controller 220 is capable of processing these signals as necessary to accomplish the goals of the instruction system 20.

FIG. 4 also shows that the digital integrated audio amplifier 128 is connected to the controller 220 via a digital data path 242. The integrate amplifier 128 comprises a digital to analog converter 244 and a linear amplifer 246. The converter 244 generates an audio signal (two audio signals in a stereo system) that is amplified by the amplifier 246 as necessary to drive a load connected thereto. In the exemplary electrical subsystem 24, the load is the headphones 142.

The exemplary tuner 122 and metronome 124 are connected to the controller 220 by data paths 248 and 250. Optionally, these devices 122 and 124 may be stand-alone devices that are unconnected to the controller 220. The tuner 122 is conventional and facilitates tuning of the guitar 22. The metronome 124 generates a sound that allows the player to keep proper time.

The exemplary subsystem 24 comprises a plurality of finger sensing circuit 252 that are arranged to detect the locations at which the player presses the string members 38 against the fingerboard 32. The finger sensing circuit 252 may take the form of contacts on the fingerboard 32 that detect the presence of the player's fingers. These contacts would be arranged at the junctures of frets and strings and are static devices that change capacitance or resistance when in contact with a finger. The data generated by the finger sensors 252, which will be referred to as feedback data, thus indicates where the player has placed his or her fingers at any point in time.

The feedback data is received by the controller 220, which, given an appropriate type of display segments 50, can display this feedback data in the instruction grid 52. In particular, to display this feedback data, the display segment must be capable of displaying at least three pieces of information: note instructions indicating desired finger placement; feedback information indicating actual finger placement; and the absence of either note instructions or feedback information.

For example, one appropriate type of display segment would require locating two LEDs of different colors at locations corresponding to the junctures of strings and frets. One LED color would correspond to note data and the other to feedback data. When both LEDs are off at a given location, the player knows that no finger is located at that given location and that no finger is supposed to be located there. When both LEDs are on at a given location, the player knows that a finger is placed at the proper location for playing of a desired note. When only one LED is on at a given location, either a note is supposed to be played that is not being played or a finger is located at a wrong location.

A similar result may be obtained with a display segment formed from an LCD panel. The panel may be programmed display three different symbols (e.g., blank display, "X", and "0") corresponding to the three states identified above. Instead of displaying two symbols simultaneously to indicate a desired note being properly played, the panel may be programed to display yet another symbol (e.g., "+") to correspond to this state.

The controller 220 may take any one of a number of different forms depending upon the feature set implemented by the system 20.

In a simple form, an instructional system constructed in accordance with the present invention may simply be capable of controlling the instruction grid 52 to display instruction to the player. Such a system would not require a complex controller, and the controller used may be any one of a number of integrated controller chips that comprise a microprocessor, ROM, RAM, and I/O ports. The ROM can be loaded with a program that turns on and off the display segments under the control of instruction data stored on a memory device such as the CDs 140, a floppy disc, or a cassette tape. A simple instruction system using such an embedded controller could easily be programmed to accommodate the control panel 126 described above.

Another form of the invention would use an existing general purpose computer to perform many of the functions of the instrument 22 described above. In particular, the controller may be a simple integrated device used as an embedded controller as described in the previous paragraph. The controller need not even be capable of controlling the CD player. To the contrary, audio playback, video display, network interface, and CD player control functions would all be performed by a general purpose computer. For the purpose of receiving note data, the embedded controller would be connected to the general purpose computer as a peripheral device conforming to standards for such peripheral devices existing in the computer industry.

A more complex form of the invention, such as is embodied in the exemplary instructional system 20, may additionally include the integrated audio amplifier 128, the network interface 224, the video system 236, and the audio system 237. The controller 220 in the system 20 could be a relatively inexpensive general purpose computer having a microprocessor, internal and external RAM and ROM, and a digital data bus or buses for communicating with peripheral devices.

In any of these configurations, the controller used by the present invention would use technology originally developed for use in computers. The use of computer technology would allow a system incorporating the principles of the present invention to make use of technological advances and cost reductions generated by the computer industry.

IV. Instructional Methods

The instructional system as described above may be used in one or more of a number of teaching environments.

In a first teaching environment, the instruction system is operated under control of an instruction course embodied in control data that is stored on a storage device such as one of the CDs 140 or a remote computer connected to the Internet. The control data includes note data defining a set of note instructions, background data defining a background audio program, and/or instruction data defining an instruction program that includes an instructional audio signal and/or an instructional visual signal. In this environment, a teacher need not be directly involved; the control data is programmed to include all of the logic necessary to instruct the student on proper fingering and technique.

For example, an instructor could develop a beginning guitar course including a set of note instructions, a background audio program including metronome tones, and audio and visual signals instructing the student on proper fingering techniques. This course would be encoded as multiple tracks on the storage device that could be played back in real time. In the context of this application, the term "real time" means real time apparent to a guitar player and thus would include a multiplexed system that operated at high frequency.

In another teaching environment, a teacher may control the instruction process. While the teacher could be on site and supplement an existing instruction course as described above, the system 20 described above could be used with a remotely located instructor. The remote instructor could be provided with a similarly equipped instrument 22, with both instruments being connected to each other through a computer network such as the Internet. The instructor would be connected to the student at least via a voice connection. Video cameras installed at both locations could allow the student to view the instructor and vice versa.

The feedback data obtained from finger sensing devices could be transmitted back and forth through the network. The network would allow the instructor to play a sequence of notes and/or chords, with the feedback data generated therefrom being transmitted to the student as control data for the student's instrument. This control data could be displayed in real time as instruction data for the student. This process could be reversed to allow the instructor to monitor the student's progress.

From the foregoing, it should be clear that the present invention may be embodied in forms other than those described above and still be within the scope of the present invention. This scope is thus defined by the claims set forth below and not the foregoing detailed description.

I claim:

1. A system for instructing a student to play music, comprising:

a body assembly;

a neck assembly rigidly extending from the body assembly, where the neck assembly defines upper and lower elongate neck edges, a playing surface on a front portion of the neck assembly extending between the upper and lower neck edges, and a palm surface on a rear portion of the neck assembly extending between the upper and lower neck edges;

a plurality of string members attached to the body assembly and the neck assembly such that the string members are suspended substantially parallel to the upper and lower neck edges and adjacent to the playing surface;

a plurality of display segments arranged in an instruction grid such that each display segment corresponds to a unique location on the playing surface; and a control circuit for operating the display segments based on note data such that the display segments communicate note instructions that indicate where the string members are to be brought into contact with the neck assembly to form musical notes; wherein the instruction grid is arranged on the back portion of the neck assembly such that, when the body assembly and the neck assembly are arranged in a playing orientation relative to the student, the instruction grid substantially faces the student to facilitate viewing of the display segments; and the instruction grid is embedded within the neck assembly and is visible through a bracing surface defined by the neck assembly.

2. A system as recited in claim 1, in which the instruction grid is configured such that the display segments are substantially located in a viewing plane and the playing surface defines a playing plane, where the viewing plane extends at a viewing angle to the playing plane.

3. A system as recited in claim 2, in which the viewing angle is substantially between 45 degrees and 135 degrees.

4. A system as recited in claim 1, in which the neck assembly further comprises a plurality of fret members arranged on the playing surface, where the instruction grid arranges the display segments at locations corresponding to intersections of fret members and string members.

5. A system as recited in claim 1, further comprising:

storage means for storing the note data; and retrieval means for retrieving the note data from the storage means, where the retrieval means is operatively connected to the control circuit to pass the note data to the control circuit.

6. A system as recited in claim 5, in which the storage means additionally stores background data corresponding to a background program, the system further comprising playback means for playing the background data such that the student can hear the background program.

7. A system as recited in claim 6, in which the storage means additionally stores instructional data corresponding to an instructional program, the system further comprising playback means for playing the instructional data such that the student can sense the instructional program.

8. A system as recited in claim 5, in which the storage means additionally stores instructional data corresponding to an instructional program, the system further comprising playback means for playing the instructional data such that the student can sense the instructional program.

9. A system as recited in claim 5, further comprising:
a transducer system that converts vibration of the string members into electrical musical signals; and
a play back system for converting the electrical musical signals into audible musical signals.

10. A system as recited in claim 1, further comprising finger sensing means for generating feedback data identifying the locations on the playing surface at which the string members are brought into contact with the neck assembly, wherein
the control circuit is operatively connected to the finger sensing means and operates the display segments to communicate the feedback data to the player.

11. A method of instructing a student to play music on an instrument having a body assembly, a neck assembly that rigidly extends from the body assembly and defines a playing surface, and a plurality of strings suspended by the body assembly and the neck assembly adjacent to the playing surface, the method comprising the steps of:
arranging a plurality of display segments in an instruction grid such that each display segment corresponds to a unique location on the playing surface; and
arranging the instruction grid on the neck assembly such that, when the body assembly and the neck assembly are arranged in a playing orientation relative to the student, the instruction grid substantially faces the student to facilitate viewing of the display segments;
operating the display segments based on control data to indicate where the string members are to be brought into contact with the neck assembly to form desired musical notes;
generating feedback data indicating the locations on the playing surface at which the string members are brought into contact with the neck assembly; and
controlling the display segments to communicate the feedback data to the player.

12. A method as recited in claim 11, further comprising the step of embedding the instruction grid within the neck assembly.

13. A method as recited in claim 11, further comprising the step of arranging the instruction grid at a viewing angle relative to the playing surface, where the viewing angle is substantially between 45 degrees and 135 degrees.

14. A system for instructing a student to play music, comprising:
a body assembly;
a neck assembly rigidly extending from the body assembly, where
the neck assembly defines
upper and lower elongate neck edges,
a playing surface on a front portion of the neck assembly extending between the upper and lower neck edges, and
a palm surface on a rear portion of the neck assembly extending between the upper and lower neck edges;
a plurality of string members attached to the body assembly and the neck assembly such that the string members are suspended substantially parallel to the upper and lower neck edges and adjacent to the playing surface;
a plurality of display segments arranged in an instruction grid such that each display segment corresponds to a unique location on the playing surface; and
a control circuit for operating the display segments based on note data such that the display segments communicate note instructions that indicate where the string members are to be brought into contact with the neck assembly to form musical notes; and
finger sensing means for generating feedback data identifying the locations on the playing surface at which the string members are brought into contact with the neck assembly; wherein
the instruction grid is arranged on the back portion of the neck assembly such that, when the body assembly and the neck assembly are arranged in a playing orientation relative to the student, the instruction grid substantially faces the student to facilitate viewing of the display segments; and
the control circuit is operatively connected to the finger sensing means and operates the display segments to communicate the feedback data to the player.

15. A system as recited in claim 14, in which the instruction grid is configured such that the display segments are substantially located in a viewing plane and the playing surface defines a playing plane, where the viewing plane extends at a viewing angle to the playing plane.

16. A system as recited in claim 15, in which the viewing angle is substantially between 45 degrees and 135 degrees.

17. A system as recited in claim 14, in which the neck assembly further comprises a plurality of fret members arranged on the playing surface, where the instruction grid arranges the display segments at locations corresponding to intersections of fret members and string members.

18. A system as recited in claim 14, further comprising:
storage means for storing the note data; and
retrieval means for retrieving the note data from the storage means, where the retrieval means is operatively connected to the control circuit to pass the note data to the control circuit.

19. A system as recited in claim 18, in which the storage means additionally stores background data corresponding to a background program, the system further comprising playback means for playing the background data such that the student can hear the background program.

20. A system as recited in claim 19, in which the storage means additionally stores instructional data corresponding to an instructional program, the system further comprising playback means for playing the instructional data such that the student can sense the instructional program.

21. A system as recited in claim 18, in which the storage means additionally stores instructional data corresponding to an instructional program, the system further comprising playback means for playing the instructional data such that the student can sense the instructional program.

22. A system as recited in claim 18, further comprising:

a transducer system that converts vibration of the string members into electrical musical signals; and a play back system for converting the electrical musical signals into audible musical signals.

23. A system as recited in claim 14, further comprising finger sensing means for generating feedback data identifying the locations on the playing surface at which the string members are brought into contact with the neck assembly, wherein the control circuit is operatively connected to the finger sensing means and operates the display segments to communicate the feedback data to the player.

* * * * *